US012642309B2

(12) United States Patent
Deakin et al.

(10) Patent No.: US 12,642,309 B2
(45) Date of Patent: Jun. 2, 2026

(54) E-CIGARETTE RECHARGEABLE BATTERY CHARGING CASE

(71) Applicant: JT International SA, Geneva (CH)

(72) Inventors: Lucinda Deakin, Vienna (AT); Alfred Tomasch, Vienna (AT)

(73) Assignee: JT International SA, Geneva (CH)

( * ) Notice: Subject to any disclaimer, the term of this patent is extended or adjusted under 35 U.S.C. 154(b) by 889 days.

(21) Appl. No.: 17/954,007

(22) Filed: Sep. 27, 2022

(65) Prior Publication Data

US 2023/0100547 A1    Mar. 30, 2023

(30) Foreign Application Priority Data

Sep. 28, 2021    (EP) ..................................... 21199637

(51) Int. Cl.
*H02J 7/00*        (2026.01)
*A24F 40/95*    (2020.01)
*H02J 7/70*        (2026.01)

(52) U.S. Cl.
CPC .............. *A24F 40/95* (2020.01); *H02J 7/751*
(2026.01)

(58) Field of Classification Search
None
See application file for complete search history.

(56) References Cited

U.S. PATENT DOCUMENTS

| | | | |
|---|---|---|---|
| 9,433,242 B1 | 9/2016 | Buffone | |
| 2016/0366946 A1* | 12/2016 | Murison | ................... B67D 7/02 |
| 2018/0000977 A1* | 1/2018 | Mitchell | .............. B05B 7/1686 |

FOREIGN PATENT DOCUMENTS

| | | |
|---|---|---|
| EP | 3838007 A1 | 6/2021 |
| WO | 2019148038 A1 | 8/2019 |
| WO | 2020049504 A1 | 3/2020 |
| WO | 2020096609 A1 | 5/2020 |

OTHER PUBLICATIONS

Extended European Search Report for Application No. 21199637.6 dated Feb. 23, 2022. 9 pgs.

* cited by examiner

*Primary Examiner* — Arun C Williams
(74) *Attorney, Agent, or Firm* — Lerner David LLP

(57) ABSTRACT

This invention relates to an e-cigarette rechargeable battery charging case comprising: a base comprising a first recess for receiving an e-cigarette rechargeable battery, a cover covering said first recess when in closed position and making said first recess accessible when in open position, a flexible hinge linking said cover to said base, a first extension of said hinge being fastened to cover structure, and a second extension of said hinge being fastened to base structure, wherein said second hinge extension: cooperates with at least an aligning part of base structure, so as to align said base and said hinge with respect to each other, and is tightened between tightening parts of said base structure, so as to maintain aligned said base and said hinge with respect to each other, over time, despite successive openings and closings of said cover.

20 Claims, 3 Drawing Sheets

E-CIGARETTE RECHARGEABLE BATTERY CHARGING CASE

CROSS-REFERENCE TO RELATED APPLICATION

The present application claims priority to European Patent Application No. 21199637.6, filed on Sep. 28, 2021, the disclosure of which is incorporated herein by reference.

FIELD OF THE INVENTION

The invention relates to the technical field of charging cases for rechargeable battery for portable smoking devices such as e-cigarettes.

BACKGROUND OF THE INVENTION

According to some existing prior arts, for example described in WO 2019/148038, WO2020/049504, WO2020/096609, it is known an e-cigarette rechargeable battery charging case, with a base containing a battery and a cover disposed so as to open and close the charging case. There is a hinge between base and cover, to allow cover pivoting with respect to base in order to open and close the e-cigarette rechargeable battery charging case.

However, such a hinge is a hard hinge which is made of several hard plastic pieces and/or several metallic pieces. This makes this hard hinge technically complex as well as hardly compatible with smart and design e-cigarette rechargeable battery charging cases requiring particularly simple and preferably monobloc elements.

Besides, if this hard hinge is to be implemented in an e-cigarette rechargeable battery charging case which itself already comprises several different materials for base structure and/or for cover structure, like for instance, both metallic and plastic parts, in either base structure and/or in cover structure, this implementation becomes technically complex and leads to a cumbersome e-cigarette rechargeable battery charging case.

Moreover, it should be kept in mind that, for an e-cigarette rechargeable battery charging case made of a base covered by a cover opening and closing this charging case quite a high number of times, over time, the hinge linking base and cover, besides being technically rather simple, should also be robust and remain stable over time, so as to allow for correct, quick, and efficient, closings and openings, over time.

SUMMARY OF THE INVENTION

The object of the present invention is to alleviate at least partly the above mentioned drawbacks.

Therefore, according to the invention, it has been noticed that:
either the hinge is technically complex,
    but it leads to all precited drawbacks,
or the hinge is technically simpler, for instance if essentially made of layer, and more practical to implement within quite a number of e-cigarette rechargeable battery charging cases, even within such charging cases where base structure and/or cover structure are made of several different materials, like metal and plastic for instance,
    but this hinge often loosens and deteriorates over time, leading to difficulties to close and open, quickly, and efficiently, the e-cigarette rechargeable battery charging case.

Therefore, according to the invention, it is proposed an e-cigarette rechargeable battery charging case where the hinge linking base and cover is a flexible hinge (no more a hard hinge), but with specific additional elements to make this flexible hinge robust and stable over time, despite successive openings and closings of the cover.

According to the invention, it has been also noticed that the presence and large extension of the battery recess within the base of this e-cigarette rechargeable battery charging case, leads to less free space within base to make the flexible hinge robust and stable on this side.

Therefore, according to the invention, it is proposed an e-cigarette rechargeable battery charging case where the hinge linking base and cover is a flexible hinge, and where the specific additional elements to make this flexible hinge robust and stable over time on the side of the base of this charging case, are specifically designed and arranged to take into account this lack of free space in the base.

According to the invention, it is proposed an e-cigarette rechargeable battery charging case comprising: a base comprising a first recess for receiving an e-cigarette rechargeable battery, a cover, covering said first recess when in closed position, making said first recess accessible when in open position, a flexible hinge linking said cover to said base, a first extension of said hinge being fastened to cover structure, a second extension of said hinge being fastened to base structure, wherein said second hinge extension: cooperates with at least an aligning part of base structure, so as to align said base and said hinge with respect to each other, and is tightened between tightening parts of said base structure, so as to maintain aligned said base and said hinge with respect to each other, over time, despite successive openings and closings of said cover. Tightening parts of said base structure are preferably clamping parts of said base structure.

According to the invention, it is also proposed a charging case assembly comprising: an e-cigarette rechargeable battery charging case according to the invention, an e-cigarette rechargeable battery.

Hence, this this e-cigarette rechargeable battery charging case is a specific charging case dedicated only to recharge the rechargeable battery of an electronic vaporizer or of any other portable smoking device.

Preferred embodiments comprise one or more of the following features, which can be taken separately or together, either in partial combination or in full combination, in association with any of precited objects of the invention.

Preferably, said second hinge extension: is centered around one or more first parts of base structure, preferably around at least 3 first parts of base structure, so as to align said base and said hinge with respect to each other.

Hence, alignment between base and hinge is made more precise, although kept rather simple.

Preferably, said second hinge extension: is tightly clamped between at least a second part and at least a third part of said base structure, so as to maintain aligned said base and said hinge with respect to each other, over time, despite successive openings and closings of said cover.

Hence, not only alignment between base and hinge can be made more precise, but such precise alignment between base and hinge can be kept, without loosening or at least with a reduced risk of loosening, over time, and despite numerous openings and closings of cover which otherwise would naturally tend to loosen a hinge, and especially a flexible hinge. Such precise alignment between base and hinge can then be kept for a longer time without loosening.

Preferably, said second hinge extension does not extend over said first recess, preferably extends over less than one quarter of width of charging case.

Hence, said second hinge extension does not interfere with recess or with other technical elements connected to recess and allowing rechargeable battery to recharge. This allows for better taking into account the lack of free space within base of charging device.

Preferably, at least some tightening parts are at a more proximal position with respect to said second hinge extension than said aligning part(s), preferably at least some tightening parts are at a more distal position with respect to said second hinge extension than said aligning part(s).

Hence, precise alignment between base and hinge can be kept more easily, while still reducing the risk of hinge loosening, over time, despite numerous openings and closings of cover. The most important zone to firmly tighten, in order to improve effective lifetime of the hinge, is the zone which is more proximal with respect to the second hinge extension than the aligning part(s).

Preferably, main material of said flexible hinge is: more flexible than main material of cover structure, preferably at least 3 times more flexible as measured in shore hardness, preferably at least 10 times more flexible as measured in shore hardness, and more flexible than main material of base structure, preferably at least 3 times more flexible as measured in shore hardness, preferably at least 10 times more flexible as measured in shore hardness.

Hence, the high flexibility of hinge allows for a simpler structure of hinge, which will be made of less separate elements assembled together, and which can even be a one-piece hinge made of a single element with no assembling step of several elements together to manufacture the hinge. This single element may be a double layer fabric.

Preferably, said cover comprises two cover shells fit into each other and sandwiching said first hinge extension in between.

Hence, this is a simple and efficient way to fix the first hinge extension to the cover of this e-cigarette rechargeable battery charging case.

Preferably, said first recess comprises at least an electrical connection implemented so as to recharge said rechargeable battery.

The recess, when containing the rechargeable battery, allows for this rechargeable battery to be recharged.

Preferably, said base comprises, successively, from said cover: an inlay comprising said first recess, said aligning part(s) and at least one of said tightening parts of said base structure, a support comprising at least another of said tightening parts of said base structure, an external base shell, visible from outside charging case, covering said aligning parts and said tightening parts of said base structure.

Hence, this multi-piece base allows for an efficient and simple way of keeping alignment between base and hinge over time, without loosening or at least with a reduced risk of loosening.

Preferably, said base inlay is made of hard plastic, said base support is made of hard plastic, said base external base shell is at least partly metallic, preferably completely metallic, preferably made of aluminum, preferably is made of aluminum, or is at least externally covered by an aluminum layer, said cover structure is made of hard plastic and fabric.

The charging case allows for different materials making its base structure, hard plastic for robust and functional parts, aluminum for externally protective and design part.

Preferably, said aligning part(s) comprise: one or more centering pins, preferably at least 3 centering pins, preferably at least 5 centering pins, said base comprises: one or more channels fitting around said centering pins. The centering pins are preferably arranged along a rectilinear direction which is parallel to the longitudinal axis of the base 1.

Hence, alignment between base and hinge is more precise, and such precise alignment is kept for a longer time without loosening.

Preferably, said tightening parts comprise one or more surfaces facing each other, and sandwiching said second hinge extension. In a first option, at least some or all of said surfaces being flat. In a second option, at least some or all of said surfaces being corrugated.

Hence, structure of tightening parts has a good compromise between simplicity and efficiency.

Preferably, said hinge comprises one or more holes respectively fitting around said one or more aligning parts.

Hence, structure of hinge has a good compromise between simplicity and efficiency.

Preferably, said hinge is essentially made of fabric, preferably completely made of fabric.

Hence, flexible hinge is:

very flexible, very simple, is compatible with smart and design e-cigarette rechargeable battery charging case.

Preferably, said hinge is essentially made of a double layer fabric having two fabric layers and a fabric fold, said fabric fold being at a more distal position than said holes in said second hinge extension, said two layers being jointly superposed in said second hinge extension.

Hence, although the lack of free space within base structure, which structure base is encumbered with technical elements allowing for recharging the rechargeable battery, this hinge second extension is made more robust and stabler over time, thereby helping to keep precise alignment between base and hinge for a longer time.

Preferably, said two layers are separately sandwiched between said cover shells in said first hinge extension, one of said two layers extending over said first recess, preferably over whole width of charging case, another of said two layers not extending over said first recess, preferably extending over less than one quarter of width of charging case.

Hence, because of more free space available within cover structure, since no technical element allowing for recharging the rechargeable battery is located there, a simple and efficient way to make first hinge extension more robust and stabler over time is implemented, thereby helping to keep precise alignment between base and hinge for a longer time.

Preferably, the e-cigarette rechargeable battery charging case also comprises a charging battery which is structured and disposed so as to charge an e-cigarette rechargeable battery and which is itself rechargeable by electric power external to said charging case, said charging case having preferably a USB port to connect said charging battery to electric power external to said charging case.

Hence, this this e-cigarette rechargeable battery charging case can be used even when no external power source lies in the vicinity, while keeping a limited overall size and weight for this e-cigarette rechargeable battery charging case.

Preferably, the e-cigarette rechargeable battery charging case also comprises a second recess for receiving an e-cigarette refill pod, said second recess having a smaller volume than said first recess.

Hence, the whole available space within the e-cigarette rechargeable battery charging case has been made useful.

Preferably, the e-cigarette rechargeable battery charging case also comprises a first indicator reflecting whether said rechargeable charging battery is charging or not, preferably reflecting a charging level of said rechargeable charging battery, said first indicator being preferably a first led light, a second indicator reflecting whether said e-cigarette rechargeable battery is charging or not, preferably reflecting a charging level of said e-cigarette rechargeable battery, said second indicator being preferably a second led light.

Hence, the user of this e-cigarette rechargeable battery charging case can easily know anytime whether this e-cigarette rechargeable battery charging case is ready for use or not.

Preferably, the e-cigarette rechargeable battery charging case also comprises a magnetic fixture located on a side opposite to said hinge, a first part of said magnetic fixture belonging to said cover, a second part of said magnetic fixture belonging to said base.

Hence, even the locking of this e-cigarette rechargeable battery charging case has been made easy and design, as the rest of this e-cigarette rechargeable battery charging case.

Further features and advantages of the invention will appear from the following description of embodiments of the invention, given as non-limiting examples, with reference to the accompanying drawings listed hereunder.

BRIEF DESCRIPTION OF THE DRAWINGS

FIGS. 6-7-8 show one and the same example of e-cigarette rechargeable battery charging case according to the invention, but these figures respectively more specifically focus on different specific parts of this e-cigarette rechargeable battery charging case.

DETAILED DESCRIPTION OF THE INVENTION

Figure 1:
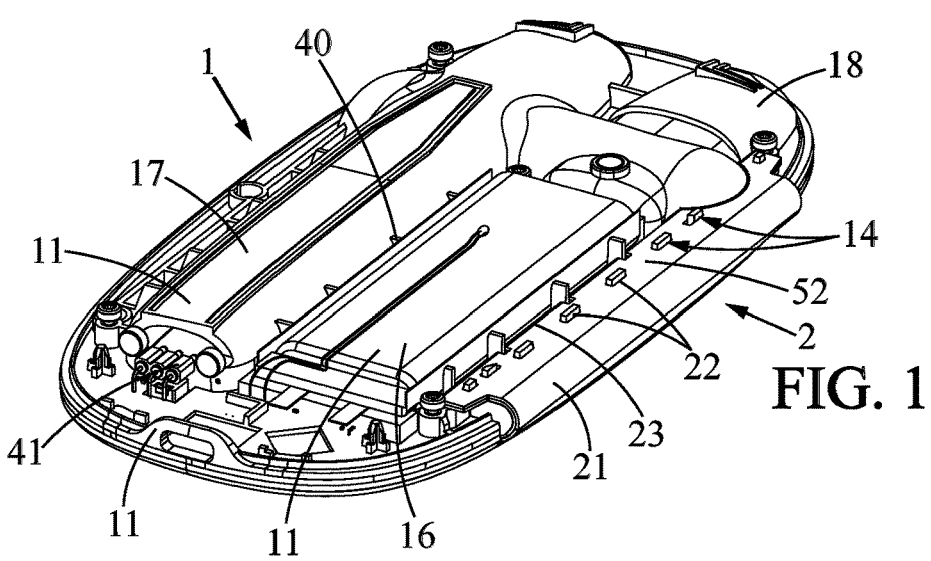
FIG. 1 shows a bottom perspective view of an example of the internal layer of the base of an e-cigarette rechargeable battery charging case according to the invention.

FIG. 1 shows a bottom perspective view of an example of the internal layer of the base of an e-cigarette rechargeable battery charging case according to the invention.

A base 1 comprises an internal layer 11 which is made of a monobloc piece of molded plastic, and more specifically of a monobloc piece of molded hard plastic. This internal layer 11 comprises 3 different recesses, which are a third main recess 16, and a second secondary recess 18, and a first main recess 17. Main recesses 16 and 17 are separated by a hollow 40. Main recess 17 has electrical connection 41 located at one of its extremities and implemented so as to recharge the rechargeable battery. Second secondary recess 18 for receiving an e-cigarette refill pod has a smaller volume than first recess 17.

This internal layer 11 is called inlay 11. This internal layer 11 comprises aligning pins 14 around which are centered holes 22 of a double layer fabric 21 making the hinge 2 linking this base 1 to its cover 3 not visible on FIG. 1, thereby aligning internal layer 11 of base 1 with double layer fabric 21 of hinge 2. Holes 22 belong to second hinge extension 52. There are at least 3 aligning pins 14 in a row, and preferably at least 5 aligning pins 14 in a row. Alignment is made more precise this way. Holes 22 of second hinge extension 52 are centered around between 3 to 5 aligning pins so as to align base 1 and hinge 2 with respect to each other.

Figure 2:
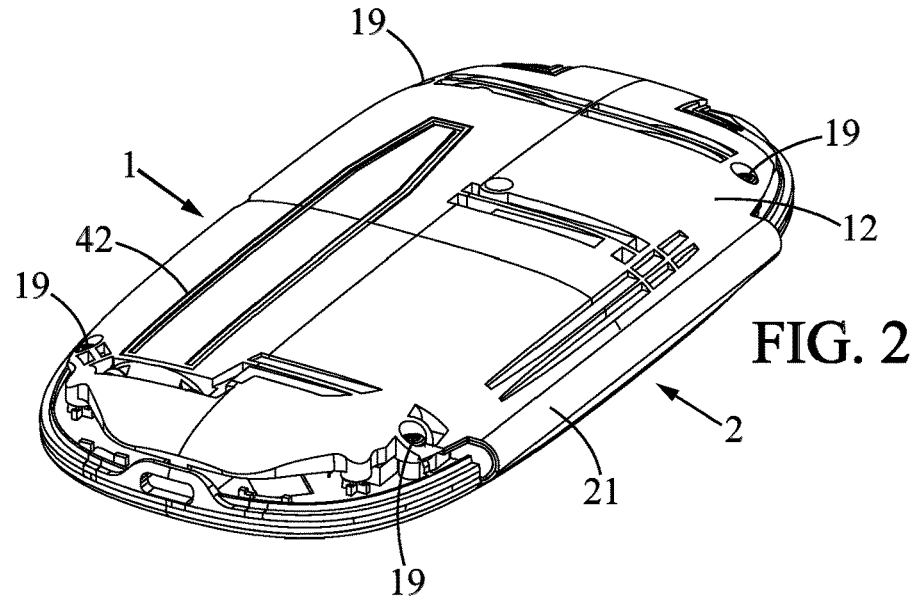
FIG. 2 shows a bottom perspective view of an example of the intermediate layer of the base of an e-cigarette rechargeable battery charging case according to the invention.

FIG. 2 shows a bottom perspective view of an example of the intermediate layer of the base of an e-cigarette rechargeable battery charging case according to the invention.

The inlay 11 is covered by a support 12. Support 12 may be a monobloc piece of molded hard plastic. Inlay 11 and support 12 can be fixed with respect to each other by one or more clips (or screws) 19, here 4 clips (or screws) 19, part of the clip 19 being located on inlay 11 and part of the clip 19 being located on support 12. Support 12 presents an opening 42 so that part of inlay 11 is still visible once covered by support 12.

Figure 3:
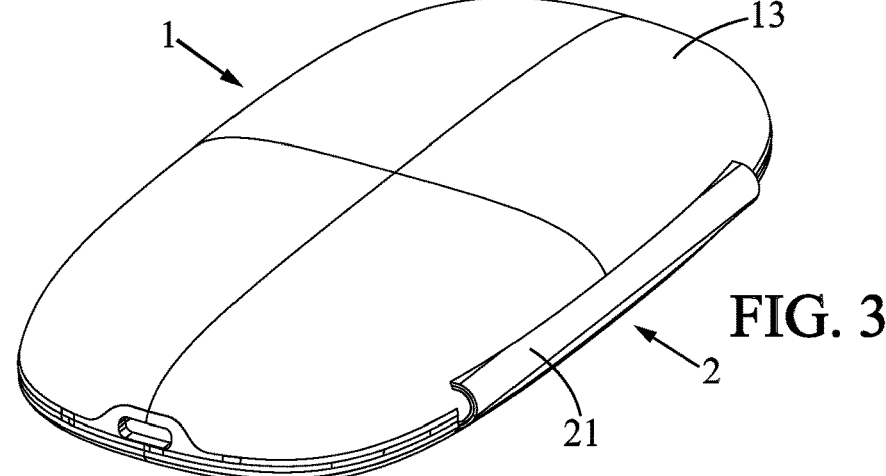
FIG. 3 shows a bottom perspective view of an example of the external layer of the base of an e-cigarette rechargeable battery charging case according to the invention.

FIG. 3 shows a bottom perspective view of an example of the external layer of the base of an e-cigarette rechargeable battery charging case according to the invention.

This external layer 13 is an external base shell 13 made of aluminum which covers support 12 so that once this external base shell 13 is installed, neither inlay 11 nor support 12 can be visible from outside the e-cigarette rechargeable battery charging case. Only double layer fabric 21 of hinge 2 is still visible from a bottom view.

Figures 4, 5:
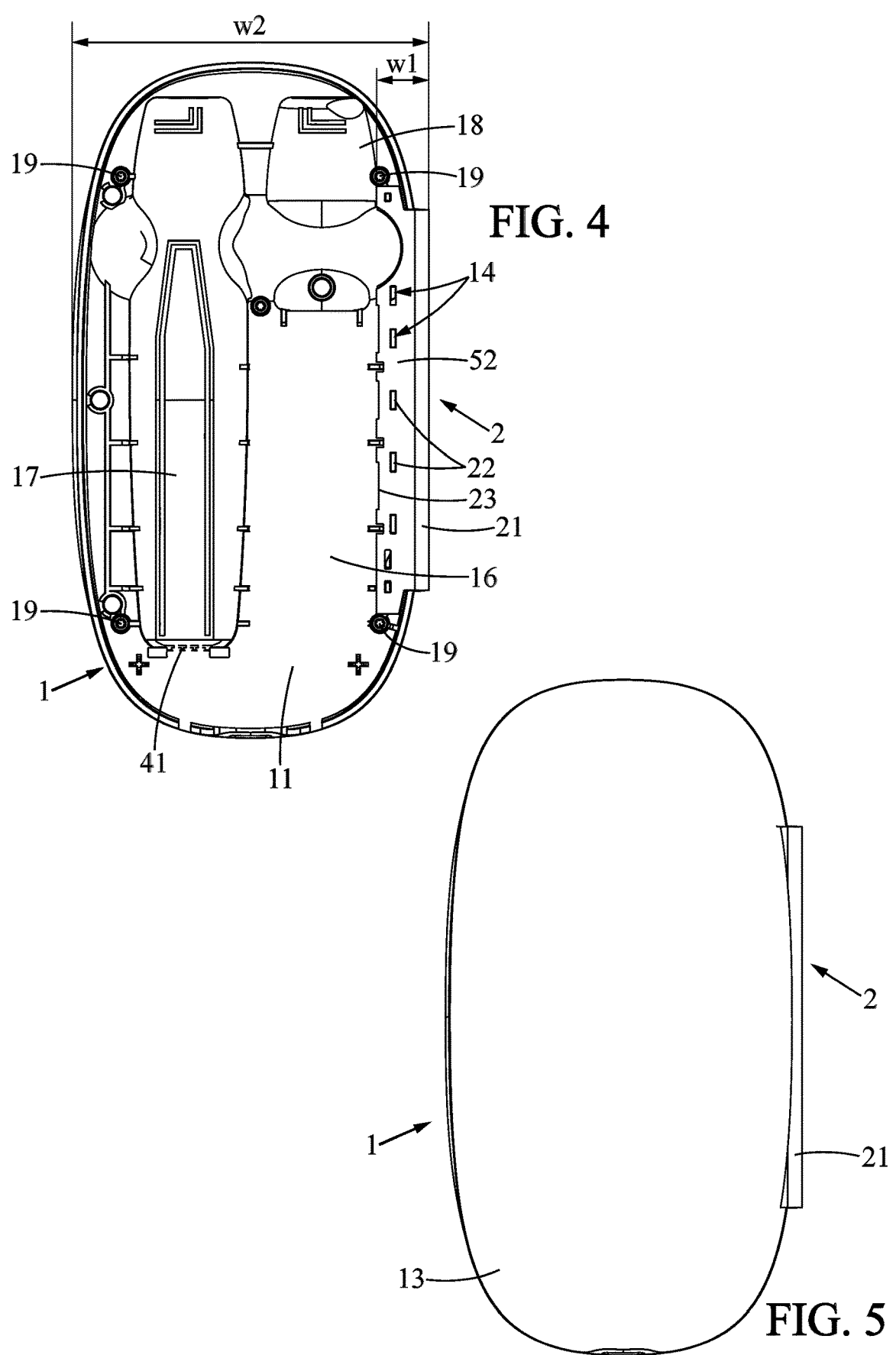
FIG. 4 shows a bottom view of an example of the internal layer of the base of an e-cigarette rechargeable battery charging case according to the invention.
FIG. 5 shows a bottom view of an example of the external layer of the base of an e-cigarette rechargeable battery charging case according to the invention.

FIG. 4 shows a bottom view of an example of the internal layer of the base of an e-cigarette rechargeable battery charging case according to the invention.

The limited extent of second hinge extension 52 width w1 (horizontally on FIG. 4) with respect to global width w2 is clearly visible. Here, on FIG. 4, it may be seen that w1/w2 is about 14%. In general, w1/w2 is comprised between about 5% and 25%. Precise alignment of hinge 2 with respect to base 1 can be seen by the 5 holes 22 in double layer fabric 21 of hinge 2 centered around the 5 alignments pins 14 of inlay 11 of base 1.

FIG. 5 shows a bottom view of an example of the external layer of the base of an e-cigarette rechargeable battery charging case according to the invention.

This external layer 13 is an external base shell 13 made of aluminum which covers support 12 so that once this external base shell 13 is installed, neither inlay 11 nor support 12 can be visible from outside the e-cigarette rechargeable battery charging case. Only double layer fabric 21 of hinge 2 is still visible from a bottom view.

Figure 6:
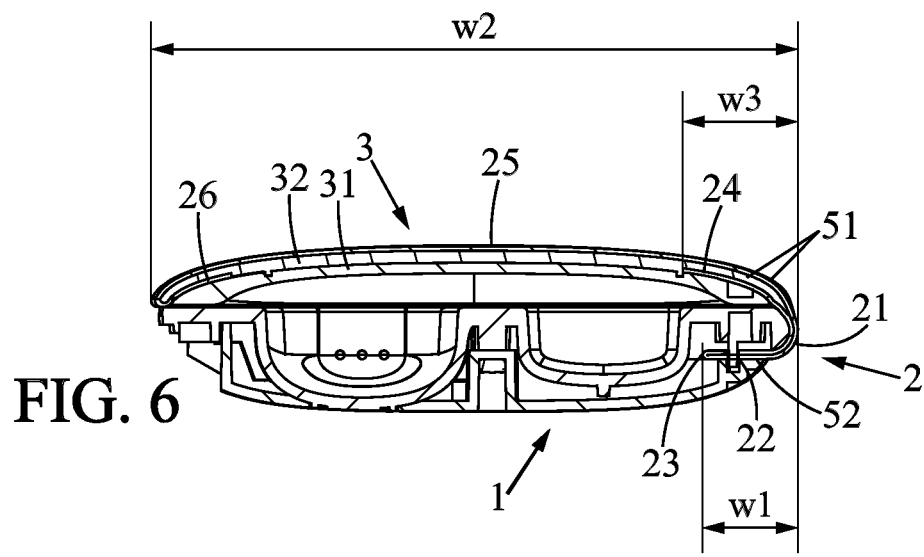
FIG. 6 shows a side sectional view of an example of an e-cigarette rechargeable battery charging case according to the invention, more specifically focusing on the cover and on the hinge of this e-cigarette rechargeable battery charging case.
Figure 7:
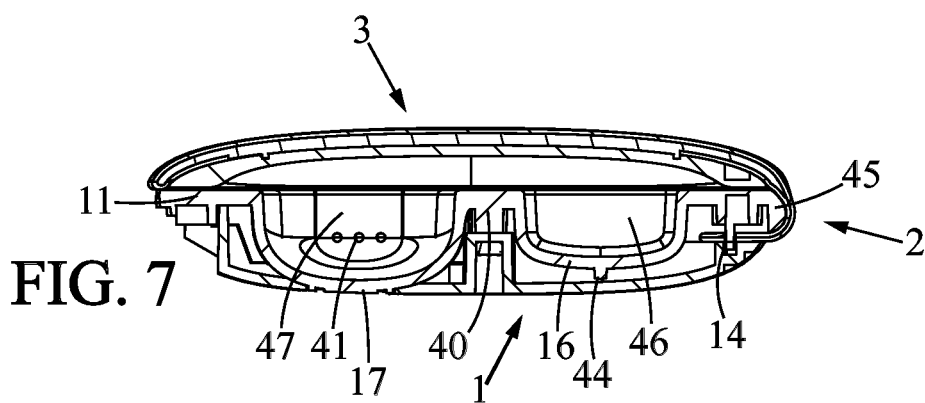
FIG. 7 shows a side sectional view of an example of an e-cigarette rechargeable battery charging case according to the invention, more specifically focusing on the internal layer of the base of this e-cigarette rechargeable battery charging case.
Figure 8:
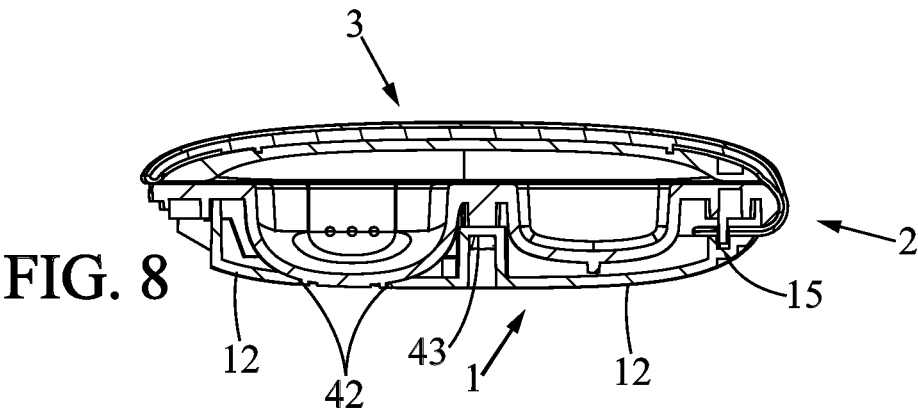
FIG. 8 shows a side sectional view of an example of an e-cigarette rechargeable battery charging case according to the invention, more specifically focusing on the intermediate layer of the base of this e-cigarette rechargeable battery charging case.

FIGS. 6-7-8 show one and the same example of e-cigarette rechargeable battery charging case according to the invention, but these figures respectively more specifically focus on different specific parts of this e-cigarette rechargeable battery charging case.

Base 1 comprises, successively, from cover 3: an inlay 11 comprising first recess 17, aligning pins 14 and one tightening part 45 of base 1 structure, a support 12 comprising another tightening part 15 of base 1 structure, an external base shell 13, visible from outside charging case, covering aligning pins 14 and tightening parts 45 and 15 of base 1 structure.

Base inlay 11 is made of hard plastic, base support 12 is made of hard plastic, external base shell 13 is made of aluminum, or is at least externally covered by an aluminum layer, cover 3 structure is made of hard plastic.

FIG. 6 shows a side sectional view of an example of an e-cigarette rechargeable battery charging case according to the invention, more specifically focusing on the cover and on the hinge of this e-cigarette rechargeable battery charging case.

Cover 3 can open and close e-cigarette rechargeable battery charging case by moving with respect to base 1 relative to hinge 2.

Cover 3 comprises two cover shells 31 and 32 fitted into each other and sandwiching first hinge extension 51 in between. More specifically, the two layers 24 and 25 of first hinge extension 51 of the double layer fabric 21 are separately sandwiched between cover shells 31 and 32. 51. End 26 of layer 25 is sandwiched between internal cover shell 31 and external cover shell 32.

Layer 25 extends over first recess 17, preferably over whole width w2 of charging case, whereas layer 24 does not extend over second recess 16, preferably extending over less than one quarter of width w2 of charging case. Layer 25 has width w3. Here w3/w2 is about 18%, whereas w1/w2 is about 14%. Preferably, w3/w2 is larger than w1/w2. Indeed, second hinge extension 52, whose width is w1, does not extend over second recess 16, and preferably extends over less than one quarter of width w2 of charging case.

Hinge 2 comprises holes 22 respectively fitting around the aligning pins 14 belonging to inlay 11 of base 1. The number of pins 14 may vary from 3 to 10, preferably 4 to 6. Hinge 2 is essentially made of fabric, and preferably completely made of fabric. More specifically, hinge 2 is essentially made of a double layer fabric 21 having two fabric layers and a fabric fold 23. This fabric fold 23 is at a more distal position than the holes 22 in second hinge extension 52. These two fabric layers are jointly superposed in second hinge extension 52.

FIG. 7 shows a side sectional view of an example of an e-cigarette rechargeable battery charging case according to the invention, more specifically focusing on the internal layer of the base of this e-cigarette rechargeable battery charging case.

Aligning pins 14 each present a protruding part around which is centered around a corresponding hole 22 of hinge 2. Aligning pins 14 may be pieces separate from inlay 11 and fit into corresponding hollows of inlay 11.

Second hinge extension 52 is tightly clamped between a second part 45 and a third part 15 of base 1 structure, so as to maintain aligned base 1 and hinge 2 with respect to each other, over time, despite successive openings and closings of cover 3.

Some tightening parts 45 and 15 are at a more proximal position with respect to second hinge extension 52 than said aligning pins 14. There may also be, some supplementary tightening parts which are located at a more distal position with respect to second hinge extension 52 than said aligning pins 14.

The e-cigarette rechargeable battery charging case also comprises a charging battery 46 which is located in second recess 16 and which is structured and disposed so as to charge an e-cigarette rechargeable battery 47, and which is itself rechargeable by electric power external to charging case, said charging case having a USB port to connect charging battery 46 to electric power external to charging case.

Second recess 16 may contain a battery 46 which can be externally recharged via a USB port which can be connected to an external power supply. First recess 17 may contain an e-cigarette rechargeable battery 47 which can be recharged by the battery 46 of the charging case.

A protruding rib 44 of second recess 16 of inlay 11 is in contact with internal face of support 12, so as to improve stability of the whole structure.

FIG. 8 shows a side sectional view of an example of an e-cigarette rechargeable battery charging case according to the invention, more specifically focusing on the intermediate layer of the base of this e-cigarette rechargeable battery charging case.

One or more channels in tightening part 15 which is indeed a clamping part 15, fit around the centering pins 14. The tightening parts 45 and 15 comprise one or more surfaces facing each other and sandwiching second hinge extension 52. Either at least some or all of these surfaces are flat, and/or preferably at least some or all of these surfaces are corrugated to better clamp double layer fabric 21 between clamping parts 45 and 15.

Main material of flexible hinge 2 is more flexible than main material of cover 3 structure, preferably at least 3 times more flexible as measured in shore hardness, preferably at least 10 times more flexible as measured in shore hardness, and more flexible than main material of base 1 structure, preferably at least 3 times more flexible as measured in shore hardness, preferably at least 10 times more flexible as measured in shore hardness.

Support 12 can be clipped on inlay 11, by the clipping of cooperating parts, respectively clipping part 40 of inlay 11 with clipping part 43 of support 12, so as to improve stability of the whole structure.

The e-cigarette rechargeable battery charging case also comprises:

a first indicator reflecting whether the rechargeable charging battery 46 is charging or not, preferably reflecting a charging level of this rechargeable charging battery 46, this first indicator being preferably a first led light, and/or a second indicator reflecting whether said e-cigarette rechargeable battery 47 is charging or not, preferably reflecting a charging level of this e-cigarette rechargeable battery 47, this second indicator being preferably a second led light.

The e-cigarette rechargeable battery charging case also comprises a magnetic fixture located on a side opposite to hinge 2, a first part of this magnetic fixture belonging to cover 3, a second part of this magnetic fixture belonging to base 1.

The invention has been described with reference to preferred embodiments. However, many variations are possible within the scope of the invention.

The invention claimed is:

1. An e-cigarette rechargeable battery charging case comprising:

a base comprising a first recess for receiving an e-cigarette rechargeable battery;

a cover covering said first recess when the cover is in a closed position, the cover making said first recess accessible when the cover is in an open position;

a flexible hinge linking said cover to said base, wherein a first extension of said hinge is fastened to the cover, and a second extension of said hinge is fastened to said base, wherein said second hinge extension cooperates with at least one aligning part of said base so as to align said base and said hinge with respect to each other, and wherein said second hinge extension is tightened between a plurality of tightening parts of said base so as to maintain said base and said hinge aligned with respect to each other irrespective of successive openings and closings of said cover.

2. The e-cigarette rechargeable battery charging case according to claim 1, wherein:

said second hinge extension is centered around one or more first parts of the base so as to align said base and said hinge with respect to each other.

3. The e-cigarette rechargeable battery charging case according to claim 1, wherein:

said second hinge extension is tightly clamped between at least a second part and at least a third part of said base so as to maintain said base and said hinge aligned with respect to each other irrespective of successive openings and closings of said cover.

4. The e-cigarette rechargeable battery charging case according to claim 1, wherein said second hinge extension does not extend over said first recess.

5. The e-cigarette rechargeable battery charging case according to claim 1, wherein at least some of the plurality of tightening parts are at a more proximal position with respect to said second hinge extension than said at least one aligning part.

6. The e-cigarette rechargeable battery charging case according to claim 1, wherein:

a main material of said flexible hinge is more flexible than a main material of said cover and more flexible than a main material of said base.

7. The e-cigarette rechargeable battery charging case according to claim 1, wherein said cover comprises two cover shells fitted into each other and sandwiching said first hinge extension therebetween.

8. The e-cigarette rechargeable battery charging case according to claim 1, wherein said first recess comprises at least an electrical connection implemented so as to recharge said rechargeable battery.

9. The e-cigarette rechargeable battery charging case according to claim 1, said base comprises, successively, from said cover:

an inlay comprising said first recess, said at least one aligning part, and at least one of said plurality of tightening parts of said base;

then a support comprising at least another one of said plurality of tightening parts of said base;

and then an external base shell visible from outside the charging case, said external base shell covering said at least one aligning part and said plurality of tightening parts of said base.

10. The e-cigarette rechargeable battery charging case according to claim 9, wherein:

said inlay comprises hard plastic.

11. The e-cigarette rechargeable battery charging case according to claim 1, wherein:

said at least one aligning part comprises one or more centering pins; and/or said base comprises one or more channels fitting around said centering pins.

12. The e-cigarette rechargeable battery charging case according to claim 1, wherein said plurality of tightening parts comprise one or more surfaces facing each other and sandwiching said second hinge extension.

13. The e-cigarette rechargeable battery charging case according to claim 1, wherein said hinge comprises one or more holes respectively fitting around said one or more aligning parts.

14. The e-cigarette rechargeable battery charging case according to claim 1, wherein said hinge comprises fabric.

15. The e-cigarette rechargeable battery charging case according to claim 13, wherein said hinge comprises a double layer fabric having two fabric layers and a fabric fold, said fabric fold being at a more distal position than said holes in said second hinge extension, said two layers being jointly superposed in said second hinge extension.

16. The e-cigarette rechargeable battery charging case according to claim 4, wherein said second hinge extension extends over less than one quarter of a width of the e-cigarette rechargeable battery charging case.

17. The e-cigarette rechargeable battery charging case according to claim 9, wherein:

said support comprises hard plastic.

18. The e-cigarette rechargeable battery charging case according to claim 9, wherein:

said external base shell at least partly comprises a metal.

19. The e-cigarette rechargeable battery charging case according to claim 18, wherein the metal is aluminum.

20. The e-cigarette rechargeable battery charging case according to claim 9, wherein:

said cover comprises hard plastic and fabric.

* * * * *